United States Patent [19]
Kolagotla et al.

[11] Patent Number: 6,047,364
[45] Date of Patent: Apr. 4, 2000

[54] TRUE MODULO ADDRESSING GENERATOR

[75] Inventors: Ravi Kumar Kolagotla, Breinigsville; Mohit Kishore Prasad, Bethlehem, both of Pa.

[73] Assignee: Lucent Technologies Inc., Murray Hill, N.J.

[21] Appl. No.: 08/918,916

[22] Filed: Aug. 27, 1997

[51] Int. Cl.$^7$ .................................................. G06F 12/02
[52] U.S. Cl. ........................... 711/217; 711/211; 711/218; 711/219; 711/220
[58] Field of Search .................................. 711/217, 218, 711/219, 220, 211

[56] References Cited

U.S. PATENT DOCUMENTS

| | | | |
|---|---|---|---|
| 4,202,035 | 5/1980 | Lane | 364/200 |
| 4,704,680 | 11/1987 | Saxe | 364/200 |
| 4,800,524 | 1/1989 | Roesgen | 364/900 |
| 4,809,156 | 2/1989 | Taber | 364/200 |
| 4,833,602 | 5/1989 | Levy et al. | 364/900 |
| 4,908,748 | 3/1990 | Pathak et al. | 364/200 |
| 4,935,867 | 6/1990 | Wang et al. | 364/200 |
| 5,276,827 | 1/1994 | Delaruelle | 711/217 |
| 5,381,360 | 1/1995 | Shridhar et al. | 364/746 |
| 5,440,705 | 8/1995 | Wang et al. | 395/421.1 |
| 5,507,027 | 4/1996 | Kawamoto | 395/375 |
| 5,511,017 | 4/1996 | Cohen et al. | 364/746 |
| 5,623,621 | 4/1997 | Garde | 395/421.1 |
| 5,649,146 | 7/1997 | Riou | 711/217 |
| 5,659,698 | 8/1997 | Weng et al. | 711/211 |
| 5,659,700 | 8/1997 | Chen et al. | 711/217 |

*Primary Examiner*—Hiep T Nguyen
*Attorney, Agent, or Firm*—David L. Smith

[57] ABSTRACT

In accordance with the present invention, an address arithmetic unit provides a modulo addressing technique for addressing a circular buffer. The address arithmetic unit includes a first selector adapted to receive as a first input a value representative of one greater than an ending address, a second input that is a beginning address, and a select input that is the sign of a displacement for stepping through addresses in a circular buffer. The first selector is adapted to select one of its inputs as an output. A carry-save adder adapted to receive as inputs an inverted representation of the first selector output, an address pointer, and a displacement. The carry-save adder is adapted to add the inputs to produce sum bits and carry bits as outputs. A sign detector adapted to determine whether a sum of the sum bits and carry bits is greater than or equal to zero, or less than zero, and for providing an output indicative of whether the sum is greater than or equal to zero, or less than zero. A second selector for receiving the comparator output and for selecting a component to include in a subsequent address pointer.

13 Claims, 3 Drawing Sheets

_6,047,364_

TRUE MODULO ADDRESSING GENERATOR

TECHNICAL FIELD

This application relates generally to modulo address generation for microprocessors and digital signal processors, and in particular to specialized circuitry and method for generating a true modulo address.

BACKGROUND OF THE INVENTION

Many applications performed on microprocessors or digital signal processors require the generation of addresses to fetch data from memory. One such application requires the appearance of a circular buffer such that data stored in a contiguous, finite portion of a memory array appears to be endless. The addressing technique used for circular buffers, known as modulo addressing, provides that an address stored in an address pointer will be incremented or decremented by a predetermined displacement for each memory access until a beginning or ending address boundary is reached or exceeded. When a beginning or ending address boundary is reached or exceeded, the address pointer for the next memory access will "wrap around" to the other end of the address range of the finite array.

Software addressing techniques have typically been used to generate modulo addresses in microprocessors. While only a few instruction cycles are required for each modulo address generating operation, in applications requiring intensive modulo address generation, as are often incurred in digital signal processing, a detrimental impact on processor performance occurs. Implementation of modulo addressing in hardware can obviate the detrimental impact on processor performance.

Modulo addressing is achieved in an address arithmetic unit by associating with a memory pointer a first register which stores either a beginning address or an ending address, and a second register which stores either the other of the ending or beginning address, or the length of the circular buffer being defined. As an example of modulo addressing, the first register may be set with a beginning address and the second register may be set with an ending address to define the address range of the finite array that comprises the circular buffer.

Known modulo addressing techniques are described in U.S. Pat. Nos. 5,623,621, 4,908,748, and 4,800,524. One shortcoming of existing modulo addressing techniques is that they are either complex and slow, or are not true modulo addressing techniques. Present modulo addressing techniques either restrict the increment or decrement displacement value to be one or restrict the size of the number of locations of the circular buffer relative to the displacement value such that the number of locations of the circular buffer is an integral multiple of the displacement value. This limitation is to assure that when memory locations in the circular buffer are addressed, and the address pointer is post incremented or post decremented in preparation for accessing a subsequent address in the circular buffer, the beginning address or ending address will not be bypassed or skipped-over. Restricting the increment or decrement displacement value to be one, assures that eventually the address pointer will take on the beginning address or the ending address generated as a result of the post increment or post decrement operation, and that a comparison to the address stored in the beginning address register or ending address register will result in a match that will cause the address generator to "wrap around" to the other end of the array.

What is needed is a true modulo addressing technique that accommodates any displacement value, buffer size and location, while using simple hardware that does not limit the speed of operation of a digital signal processor employing the technique.

SUMMARY OF THE INVENTION

In accordance with the present invention, an address arithmetic unit provides a modulo addressing technique for addressing a circular buffer. The address arithmetic unit includes a first selector adapted to receive as a first input a value representative of one greater than an ending address, a second input that is a beginning address, and a select input that is the sign of a displacement for stepping through addresses in a circular buffer. The first selector is adapted to select one of its inputs as an output. A carry-save adder adapted to receive as inputs a negative representation of the first selector output, an address pointer, and a displacement. The carry-save adder is adapted to add the inputs to produce sum bits and carry bits as outputs. A sign detector adapted to determine whether a sum of the sum bits and carry bits is greater than or equal to zero, or less than zero, and for providing an output indicative of whether the sum is greater than or equal to zero, or less than zero. A second selector for receiving the comparator output and for selecting a component to include in a subsequent address pointer.

DETAILED DESCRIPTION

Figure 1:
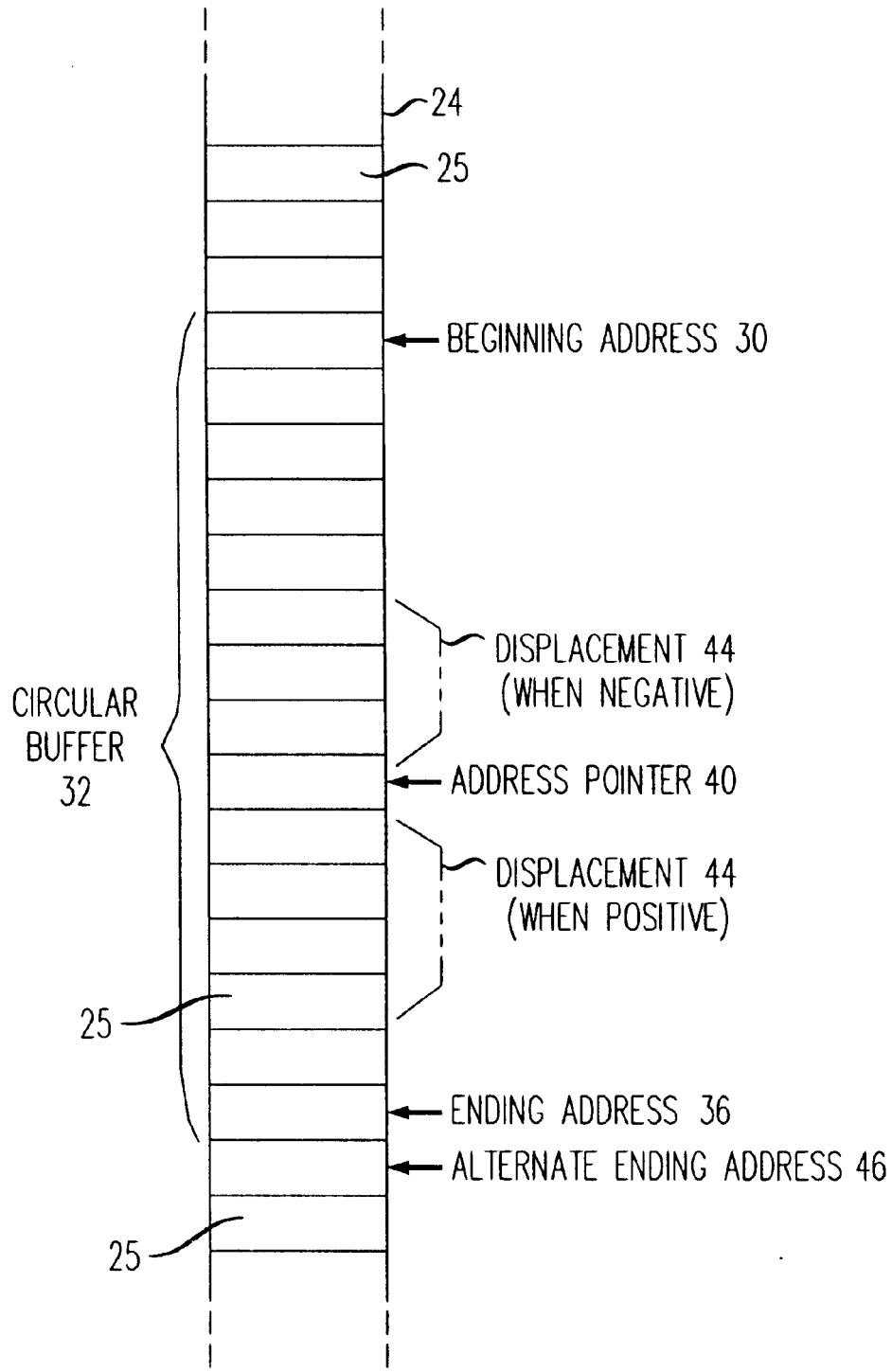
FIG. 1 is a portion of a memory array, including a circular buffer defined by a beginning address and an ending address, an address pointer, and a displacement having either a positive or negative displacement.

The address management system of the present invention may be used to generate modulo addresses, such as in a microprocessor, microcontroller, or digital signal processor. FIG. 1 illustrates a portion of a memory array 24 having individually addressable memory locations or registers 25 in an integrated circuit 26. Also shown are beginning address 30 which defines the address of the initial memory location in memory array 24 where circular buffer 32 begins and an ending address 36 which defines the address of the last memory location in memory array 24 where circular buffer 32 ends. The beginning address 30 and ending address 36 thus define the address boundaries of circular buffer 32. Also shown is an alternate ending address 46 which will be discussed below. Address pointer 40 retains the address of the memory location or register of circular buffer 32 that will be accessed next. Displacement 44 can be either positive, typically but not limited to indicating an increment, or negative, typically but not limited to indicating a decrement. The displacement is used to step through addresses of circular buffer 32 in a selective manner that is user defined. Typically the displacement is a fixed value, but the invention is not limited thereto.

Given a displacement 44, that is either an increment or decrement, circular buffer 32 is addressed typically starting at beginning address 30 stored in beginning address register 28 for increments, and typically starting at ending address 36 for decrements. After each memory location access is initiated, a new address for use in a subsequent memory access is generated and compared to the address stored in one of beginning address register 28 or ending address register 34. The comparison to the beginning address or ending address is to determine if an address boundary has been reached or exceeded such that address pointer 40 for the next memory access should "wrap around" to the other address boundary in circular buffer 32.

Knowing the beginning address and ending address of a circular buffer 32, as well as the present address pointer and displacement, the right side of equations (1) through (4) represent operations to be performed to generate the address pointer, shown on the left side of equations (1) through (4), for a subsequent memory access. When displacement is positive, equations (1) and (2) are used; when displacement is negative, equations (3) and (4) are used.

$$\binom{address}{pointer} = \binom{address}{pointer} + displacement \quad (1)$$

$$if \binom{address}{pointer} + displacement \le \binom{ending}{address}$$

$$\binom{address}{pointer} = \binom{address}{pointer} + displacement - \quad (2)$$

$$\binom{ending}{address} - 1 + \binom{beginning}{address}$$

$$if \binom{address}{pointer} + displacement > \binom{ending}{address}$$

$$\binom{address}{pointer} = \binom{address}{pointer} + displacement - \quad (3)$$

$$\binom{beginning}{address} + \binom{ending}{address} + 1$$

$$if \binom{address}{pointer} + displacement < \binom{beginning}{address}$$

$$\binom{address}{pointer} = \binom{address}{pointer} + displacement \quad (4)$$

$$if \binom{address}{pointer} + displacement \ge \binom{beginning}{address}$$

When one of the beginning and ending addresses of a circular buffer 32 are known, as well as the present address pointer, displacement and length of circular buffer 32, equations (1) through (4) can be rewritten in terms of the known quantities. Analytically, the address computation and address comparison operations share common computations. Advantage can be taken of the common computations to generate modulo addresses more efficiently. For example, when the beginning address is known, equations (1) through (4) can be written as equations (5) through (8). Equations (5) and (6) are used when displacement is positive, equations (7) and (8) are used when displacement is negative.

$$\binom{address}{pointer} = \binom{address}{pointer} + displacement \quad (5)$$

$$if \binom{address}{pointer} + displacement < \binom{beginning}{address} + length$$

$$\binom{address}{pointer} = \binom{address}{pointer} + displacement - length \quad (6)$$

$$if \binom{address}{pointer} + displacement \ge \binom{beginning}{address} + length$$

$$\binom{address}{pointer} = \binom{address}{pointer} + displacement + length \quad (7)$$

$$if \binom{address}{pointer} + displacement < \binom{beginning}{address}$$

$$\binom{address}{pointer} = \binom{address}{pointer} + displacement \quad (8)$$

$$if \binom{address}{pointer} + displacement \ge \binom{beginning}{address}$$

Defining alternate ending address (written as alternate ending in the equations below) as the address of the first memory location beyond the ending address, alternate ending address = ending address +1, equations (1) through (4) can be rewritten as equations (9) through (12) as follows:

$$\binom{address}{pointer} = \binom{address}{pointer} + displacement \quad (9)$$

$$if \binom{address}{pointer} + displacement < \binom{alternate}{ending}$$

$$\binom{address}{pointer} = \binom{address}{pointer} + displacement - \quad 10$$

$$\binom{alternate}{ending} + \binom{beginning}{address}$$

$$if \binom{address}{pointer} + displacement \ge \binom{alternate}{ending}$$

$$\binom{address}{pointer} = \binom{address}{pointer} + displacement - \quad (11)$$

$$\binom{beginning}{address} + \binom{alternate}{ending}$$

$$if \binom{address}{pointer} + displacement < \binom{beginning}{address}$$

$$\binom{address}{pointer} = \binom{address}{pointer} + displacement \quad (12)$$

$$if \binom{address}{pointer} + displacement \ge \binom{beginning}{address}$$

Adding the alternate ending address to the right side of equation (9), and also subtracting alternate ending address from the right side of the equation (9) to maintain the equality, as well as rearranging the terms of the condition of equations 9 and 10 equations (9) and (10) can be rewritten as equations (13) and (14), as follows:

$$\binom{address}{pointer} = \binom{address}{pointer} + displacement - \quad (13)$$

$$\binom{alternate}{ending} + \binom{alternate}{ending}$$

$$if \binom{address}{pointer} + displacement - \binom{alternate}{ending} < 0$$

-continued $$\begin{pmatrix} \text{address} \\ \text{pointer} \end{pmatrix} = \begin{pmatrix} \text{address} \\ \text{pointer} \end{pmatrix} + \text{displacement} - \qquad (14)$$

$$\begin{pmatrix} \text{alternate} \\ \text{ending} \end{pmatrix} + \begin{pmatrix} \text{beginning} \\ \text{address} \end{pmatrix}$$

$$\text{if } \begin{pmatrix} \text{address} \\ \text{pointer} \end{pmatrix} + \text{displacement} - \begin{pmatrix} \text{alternate} \\ \text{ending} \end{pmatrix} \ge 0$$

Similarly, adding beginning address to the right side of equation (12), and also subtracting beginning address from the right side of equation (12) to maintain the equality, as well as rearranging the terms of the condition of equations (11) and (12), equations (11) and (12) can be rewritten as equations (15) and (16) as follows:

$$\begin{pmatrix} \text{address} \\ \text{pointer} \end{pmatrix} = \begin{pmatrix} \text{address} \\ \text{pointer} \end{pmatrix} + \text{displacement} - \qquad (15)$$

$$\begin{pmatrix} \text{beginning} \\ \text{address} \end{pmatrix} + \begin{pmatrix} \text{alternate} \\ \text{ending} \end{pmatrix}$$

$$\text{if } \begin{pmatrix} \text{address} \\ \text{pointer} \end{pmatrix} + \text{displacement} - \begin{pmatrix} \text{beginning} \\ \text{address} \end{pmatrix} < 0$$

$$\begin{pmatrix} \text{address} \\ \text{pointer} \end{pmatrix} = \begin{pmatrix} \text{address} \\ \text{pointer} \end{pmatrix} + \text{displacement} - \qquad (16)$$

$$\begin{pmatrix} \text{beginning} \\ \text{address} \end{pmatrix} + \begin{pmatrix} \text{beginning} \\ \text{address} \end{pmatrix}$$

$$\text{if } \begin{pmatrix} \text{address} \\ \text{pointer} \end{pmatrix} + \text{displacement} - \begin{pmatrix} \text{beginning} \\ \text{address} \end{pmatrix} \ge 0$$

In each of equations (13) and (14), the expression (address pointer +displacement +alternate ending address) is generated and the sign tested. The same expression comprises a portion of the newly generated address pointer. However, the expression need only be generated once. Similarly, in each of equations (15) and (16) the expression (address pointer+ displacement−beginning address) is generated and sign tested. The same expression comprises a portion of the newly generated address pointer and need only be generated once.

Figure 2:
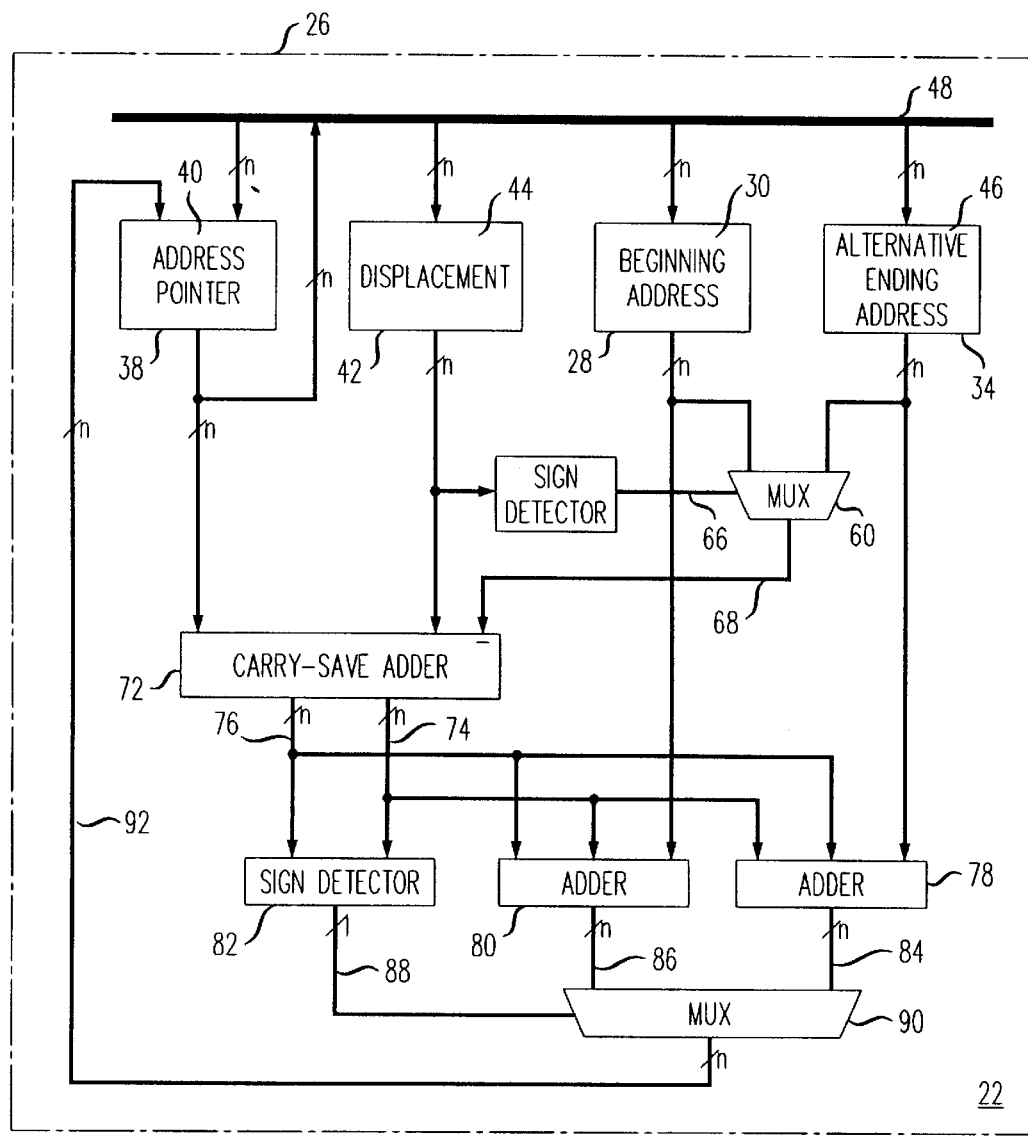
FIG. 2 is a portion of an address arithmetic unit in accordance with an illustrative embodiment of the invention.

FIG. 2 is a circuit illustrating a portion of an address arithmetic unit 22 for generating the address pointer 40 in a processor 26 such as a microprocessor, microcontroller or digital signal processor by modulo addressing, such as a result of incrementing or decrementing the value of address pointer 40. Arithmetic unit 22 implements modulo addressing in accordance with equations (13) through (16). The address pointer 40, displacement 44, and beginning address 30 are loaded from bus 48 into, respectively, address pointer register 38, displacement register 42, and beginning address register 28. In addition, alternate ending address 46 is calculated, from ending address 36 and is loaded into alternate ending address register 34 from Multiplexer 60 receives as a first input alternate ending address 46 from alternate ending address register 34. Multiplexer 60 receives as a second input beginning address 30 from beginning address register 28. Select input 66 is the sign of displacement 44. When the displacement 44 is positive indicating stepping through addresses of circular buffer 32 such that a subsequent address increments relative to a previous address pointer, alternate ending address 46 is selected as the output 68 of multiplexer 60. When the displacement 44 is negative indicating stepping through address of circular buffer 32 such that a subsequent address pointer decrements relative to a previous address pointer, beginning address 30 is selected as output 68 of multiplexer 60.

Output 68 from multiplexer 60 is a first input to carry-save adder 72. Carry-save adder 72 receives two other inputs, the current address pointer 40 from address pointer register 38 and the displacement 44 from displacement register 42. Carry-save adder 72 combines the three inputs by subtracting output 68 from the sum of address pointer 40 and displacement 44. Carry-save adder 72 does not complete the addition of its inputs but provides two outputs. The first output is sum bits 74 and the second output is carry bits 76. Sum bits 74 and carry bits 76 are provided simultaneously to adders 78 and 80 as well as sign detector 82. Sign detector 82 determines whether the sum of sum bits 74 and carry bits 76 is greater than or equal to zero, or less than zero.

Adder 78 receives sum bits 74 as a first input, carry bits 76 as a second input and alternate ending address 46 as a third input, and adds these three inputs to produce an output 84. Output 84 is a first potential address pointer. Adder 80 receives sum bits 74 as a first input, carry bits 76 as a second input and beginning address 30 as a third input, and adds the three inputs to produce output 86. Output 86 is a second potential address pointer. Sign detector 82 receives sum bits 74 as a first input and carry bits 76 as a second input. Sign detector 82 provides a single output 88. The sum of the sum bits 74 and carry bits 76 may or may not be completed. As is known in the art, sign detector 82 determines whether the sum of sum bits 74 and carry bits 76 is greater than or equal to zero, or less than zero. The output of sign detector 82 is a first logic state, such as one, when the sign of the sum is greater than or equal to one, and a second logic state, such as zero, when the sign is of the sum of the sum bits 74 and carry bits 76 is less than zero.

Output 88 from sign detector 82 is used to determine which of beginning address 30 or alternative ending address 46 is included in the calculation of the address pointer for a subsequent memory access to circular buffer 32. An output 88 from sign detector 82 is coupled as the select input to multiplexer 90. When sign detector 82 determines the sign of sum bits 74 and carry bits 76 and determines the sum is less than zero, output 88 takes on a first logic state, such as one, multiplexer 90 selects from first input 84 and second input 86 input 84 which represents the first potential address pointer, as its output 92. When sign detector 82 determines the sign of sum bits 74 and carry bits 76 and determines the sum is greater than or equal to zero, output 88 takes on a second state, such as zero. With output 88, which is the select input to multiplexer 90, in a second state, multiplexer 90 selects input 86, the second potential address pointer, as its output 92. Output 92 is the modulo address pointer 40 for the subsequent memory access to circular buffer 32 and is provided as an input to address pointer register 38.

One advantage of the address arithmetic unit 22 illustrated in FIG. 2 is that sum bits 74 and carry bits 76 are provided simultaneously to adders 78 and 80 as well as sign detector 82. Adders 78 and 80 operate simultaneously to calculate the first and second potential address pointers in parallel with each other and in parallel with sign detector 82 detecting the sign. Operating in parallel reduces the amount of logic in the critical path to produce an output that is the address pointer for a subsequent iteration. The potential address pointers 84 and 86 are available simultaneously and the appropriate one of the two potential address pointers is selected based on the sign detector output 88.

Figure 3:
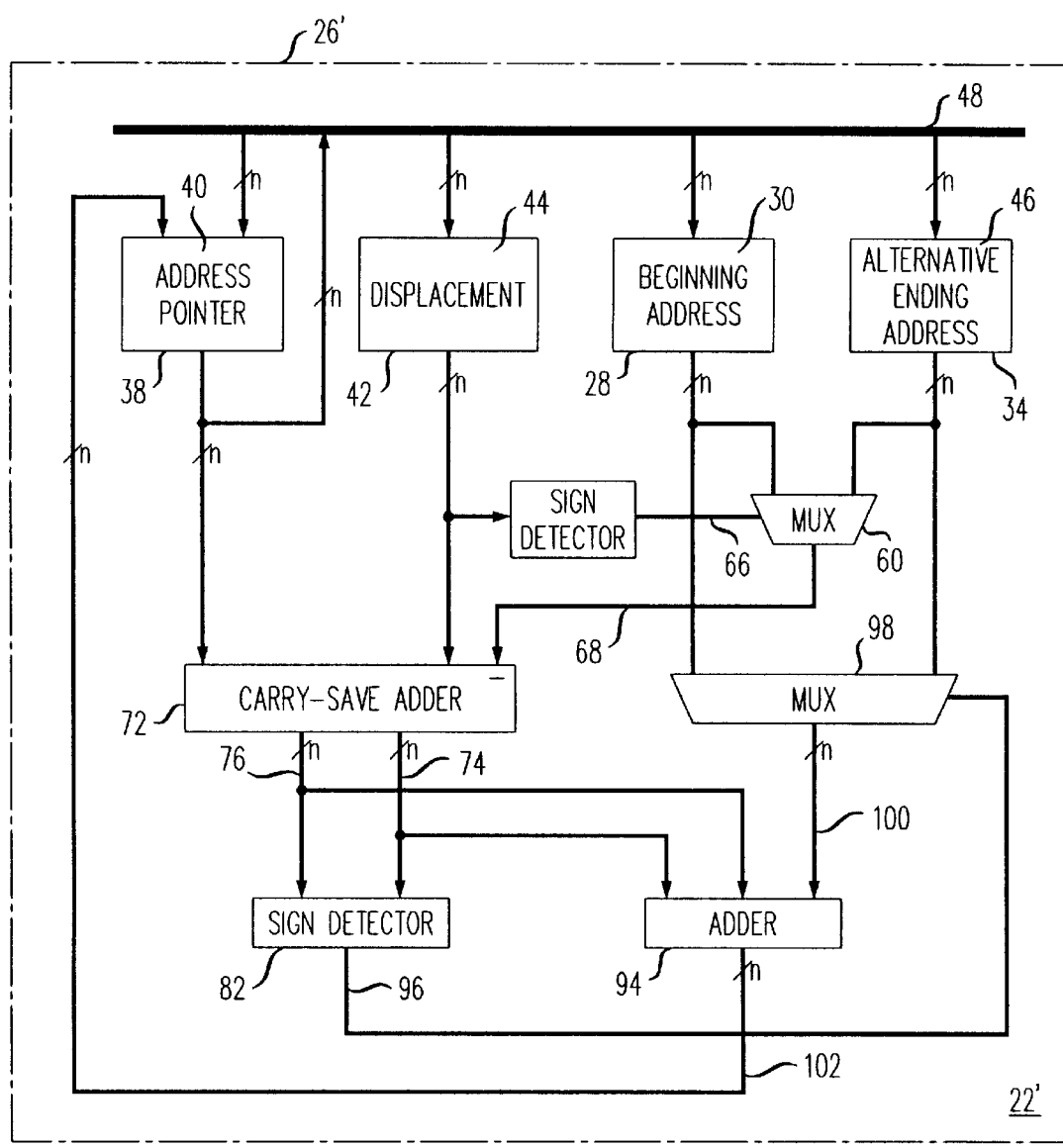
FIG. 3 is a portion of an alternative embodiment arithmetic unit.

An alternative embodiment address arithmetic unit 22' is illustrated in FIG. 3 in a processor 26'. As in the embodiment illustrated in FIG. 2, in FIG. 3, multiplexer 60 selects one of two inputs representing alternate ending address 46 or beginning address 30 as its output 68 based on select input 66 which is the sign of the displacement typically indicating an increment or decrement. Output 68 provides a first input to carry-save adder 72. The other inputs to carry-save adder 72 are the current address pointer 40 and displacement 44.

Carry-save adder 72 produces sum bits 74 and carry bits 76 which are simultaneously provided to sign detector 82 and adder 94.

Sign detector 82 detects whether the sum of the address pointer and displacement combined with the selected beginning address or alternative ending address is greater than or equal to zero, or less than zero. Sign detector 82 provides an output 96 that is a first state, such as a logic 1, when the sign of the sum is less than zero, and an output 96 that is of a second state, such as a logic 0, when the sign of the sum of the address pointer and displacement combined with the selected beginning address or alternate ending address is greater than or equal to zero.

Output 96 from sign detector 82 is used to determine which of beginning address 30 or alternative ending address 46 is included in the calculation of the address pointer for a subsequent memory access to circular buffer 32. Output 96 from sign detector 82 provides the select input to multiplexer 98. Multiplexer 98 receives as its inputs the same inputs as multiplexer 60. Multiplexer 98 selects the alternate ending address 46 as its output 100 when the output of sign detector 82 is a first logic state such as 1, and selects beginning address 30 as its output 100 when sign detector 82 provides an output that is a second logic state such as zero. Output 100 from multiplexer 98 provides a third input to adder 94. When the output 100 is available as an input to adder 94, adder 94 adds the selected alternate ending address or beginning address to the sum bits 74 and carry bits 76 to produce as an output 102 an updated address pointer for a subsequent memory access. The updated address pointer is provided as an input to address pointer register 38 to update the address pointer 40 stored therein.

The alternative embodiment of the invention illustrated in FIG. 3 selects through mux 98 which of the inputs, alternate ending address or beginning address, to include in the sum provided by adder 94 and must wait until that selection is made before the addition in adder 94 can be completed. In the address arithmetic units 22 and 22', there is no restriction on the magnitude of the displacement or whether the displacement is an increment or a decrement.

The invention may be used in pre or post increment or pre or post decrement modulo address generation. The invention may be fabricated using any known VLSI processes in one or more integrated circuits with particular application in microprocessors, microcontrollers or digital signal processors. The invention is particularly useful in communication systems and equipment employing integrated circuits including circular buffers. Such communication systems and equipment have the advantage of greater flexibility to accomplish signal processing.

The invention claimed is:

1. A method of generating a new modulo sequence address pointer to access memory locations in a buffer defined by a beginning address and an ending address, comprising the steps of:

selecting between one greater than the ending address and the beginning address as a selected address;

generating sum bits and carry bits based on a current address pointer, a displacement and the selected address;

detecting a sign of the sum of the sum bits and carry bits; and employing the detected sign to determine whether the beginning address or one greater than the ending address is included in calculation of the new address pointer.

2. A method of generating a new address pointer to access memory locations in a buffer as recited in claim 1, wherein the employing step further comprises:

adding the sum bits, carry bits, and one greater than an ending address to form a first potential new address pointer;

adding the sum bits, carry bits, and beginning address to provide a second potential new address pointer; and selecting one of the first potential new address pointer and the second potential new address pointer as the new address pointer based on the detected sign.

3. A method of generating new address pointer to access memory locations in a buffer as recited in claim 1, wherein the employing step further comprises:

selecting between one greater than an ending address and a beginning address based on the detected sign to produce a second selected address; and adding the sum bits, carry bits, and second selected address to provide the new address pointer.

4. A circuit including an address arithmetic unit, comprising:

a first selector adapted to receive a first input representative of one greater than an ending address of a circular buffer, a second input representative of a beginning address of the circular buffer, and a third input indicative of the sign of a displacement for stepping through addresses of memory locations in the circular buffer, the first selector adapted to select as an output one of the first and second inputs based on a state of the third input;

a carry-save adder adapted to receive as inputs an address pointer, the displacement, and an inverted representation of the first selector output, the carry-save adder adapted to add the inputs to produce sum bits and carry bits as outputs;

a sign detector adapted to receive as inputs the sum bits and carry bits from the carry-save adder, the sign detector adapted to provide an output indicative of whether a sum of the inputs is of a first state or a second state;

a first adder adapted to receive as inputs the sum bits and carry bits from the carry-save adder, and the input representative of one greater than the ending address, the first adder adapted to add the inputs to provide an output that is a first potential address pointer;

a second adder adapted to receive as inputs the sum bits and carry bits from the carry-save adder, and the input representative of the beginning address, the adder adapted to add the inputs to provide an output that is a second potential address pointer; and a second selector adapted to receive the first potential address pointer as a first input, the second potential address pointer as a second input, and the output of the sign detector as a third input, the second selector adapted to select as an output one of the first and second potential address pointers as an address pointer based on a state of the third input.

5. The circuit as recited in claim 4, wherein at least one of said first and second selectors is a multiplexer.

6. The circuit as recited in claim 4, wherein the sign detector is a comparator.

7. The circuit as recited in claim 4, wherein the circuit is an integrated circuit.

8. The circuit as recited in claim 7, wherein the integrated circuit is a digital signal processor.

9. A circuit including an address arithmetic unit, a first selector adapted to receive a first input representative of one greater than an ending address of a circular buffer, a second input representative of a beginning address of the circular buffer, and a third input indicative of a sign of a displacement for stepping through addresses of memory locations in the circular buffer, the first selector adapted to select as an output one of the first and second inputs based on a state of the third input;

a carry-save adder adapted to receive as inputs an inverted representation of the first selector output, an address pointer, and a displacement, the carry-save adder adapted to add the inputs to produce sum bits and carry bits as outputs;

a sign detector adapted to receive as inputs the sum bits and carry bits from the carry-save adder, the sign detector adapted to provide an output indicative of whether a sum of the inputs is of a first state or a second state;

a second selector adapted to receive the input representative of one greater than the ending address as a first input, the input representative of the beginning address as a second input, and the output of the sign detector as a third input, the second selector adapted to select as an output one of the first and second inputs based on a state of the third input; and an adder adapted to receive as inputs the sum bits and carry bits from the carry-save adder, and the output from the second selector, the adder adapted to add the inputs to provide an output that is an address pointer.

10. The circuit as recited in claim 9, wherein at least one of said first and second selectors is a multiplexer.

11. The circuit as recited in claim 9, wherein the circuit is an integrated circuit.

12. The circuit as recited in claim 11, wherein the integrated circuit is a digital signal processor.

13. The circuit as recited in claim 11, wherein the integrated circuit is a microprocessor.

* * * * *